(12) United States Patent
Chang

(10) Patent No.: US 8,475,063 B1
(45) Date of Patent: Jul. 2, 2013

(54) LENS CAP

(76) Inventor: Chung Jen Chang, Taichung (TW)

( * ) Notice: Subject to any disclaimer, the term of this patent is extended or adjusted under 35 U.S.C. 154(b) by 0 days.

(21) Appl. No.: 13/342,190

(22) Filed: Jan. 2, 2012

(51) Int. Cl.
*G03B 11/04* (2006.01)

(52) U.S. Cl.
USPC .................. 396/448; 396/534; 359/511

(58) Field of Classification Search
USPC .................. 396/448, 534; 359/511
See application file for complete search history.

(56) References Cited

U.S. PATENT DOCUMENTS

| | | | |
|---|---|---|---|
| 3,715,149 A * | 2/1973 | Freeland | 359/611 |
| 3,836,985 A * | 9/1974 | Lange | 396/448 |
| 4,045,117 A * | 8/1977 | Lerner | 359/612 |
| 4,295,706 A * | 10/1981 | Frost | 359/611 |
| 5,294,954 A * | 3/1994 | Nomura et al. | 396/448 |
| 5,541,696 A * | 7/1996 | Bittner | 396/448 |
| 5,631,772 A * | 5/1997 | Mizukawa | 359/511 |
| 5,745,803 A * | 4/1998 | Ito | 396/83 |
| 6,280,040 B1 * | 8/2001 | Koide | 359/600 |
| 6,443,634 B1 * | 9/2002 | Tsuboi | 396/448 |
| 7,037,007 B2 * | 5/2006 | Ohmori et al. | 396/448 |
| 8,280,241 B1 * | 10/2012 | Chang | 396/534 |
| 2004/0151492 A1 * | 8/2004 | Blok et al. | 396/534 |
| 2009/0002823 A1 * | 1/2009 | Law et al. | 359/511 |

FOREIGN PATENT DOCUMENTS

JP  02118535 A  *  5/1990

* cited by examiner

*Primary Examiner* — Mark Consilvio

(57) ABSTRACT

A lens cap includes a ring detachably mounted onto a lens of an optical apparatus and a pair of linkage sets pivotally connected to the ring, wherein the two linkage sets are diametrically corresponding to each other and respectively connected to a covering structure. A sleeve is longitudinally and slidably sleeved on the ring and the covering structure is connected to sleeve. As a result, the covering structure selectively opens/closes the sleeve when the sleeve is reciprocally moved relative to the ring. The covering structure and the sleeve are used as a lens cap when the covering structure closing the sleeve, and used as a lens hood when the covering structure is opened.

11 Claims, 11 Drawing Sheets

LENS CAP

BACKGROUND OF THE INVENTION

1. Field of the Invention

The present invention relates to a lens cap, and more particularly to a lens cap that can be eternally mounted onto a lens and combines with the function of a lend hood.

2. Description of Related Art

A lens is one of the most important of a camera. A quality of the picture is usually decided by a level of the lens. Consequently, a lens cap is disposed to the lens for covering the lens and to prevent the lens from being scraped.

A conventional lens cap is detachably mounted onto the lens such that the lens cap must be detached form the lens before using the camera. However, the lens cap is often lost because is has a small volume. It is very inconvenient such that some camera manufacturers provide a strip to connect the detached lens cap and the lens. As a result, the detached lens cap is continually swung during operation such that the model and the cameraman may be distracted due to the swung lens cap.

In addition, a lens hood is necessary under some condition and the lens hood is mounted after detaching the lens cap. How to combine the functions of the lens cap and the lens hood is another problem of the conventional lens cap.

The present invention has arisen to mitigate and/or obviate the disadvantages of the conventional lens cap.

SUMMARY OF THE INVENTION

The main objective of the present invention is to provide an improved lens cap that can be eternally mounted onto a lens and combines with the function of a lend hood.

To achieve the objective, the lens cap in accordance with the present invention comprises a ring detachably mounted onto a lens of an optical apparatus and a pair of linkage sets pivotally connected to the ring, wherein the two linkage sets are diametrically corresponding to each other and respectively connected to a covering structure. A sleeve is longitudinally and slidably sleeved on the ring and the covering structure is connected to sleeve. As a result, the covering structure selectively opens/closes the sleeve when the sleeve is reciprocally moved relative to the ring. The covering structure and the sleeve are used as a lens cap when the covering structure closing the sleeve, and used as a lens hood when the covering structure is opened. the lens cap in accordance with the present invention is easily operated and can be used as a lens hood when being opened. Consequently, the lens cap in accordance with the present invention should not be lost because it does not need to be detached from the lens before taking pictures.

Further benefits and advantages of the present invention will become apparent after a careful reading of the detailed description with appropriate reference to the accompanying drawings.

DETAILED DESCRIPTION OF THE INVENTION

Figure 1:
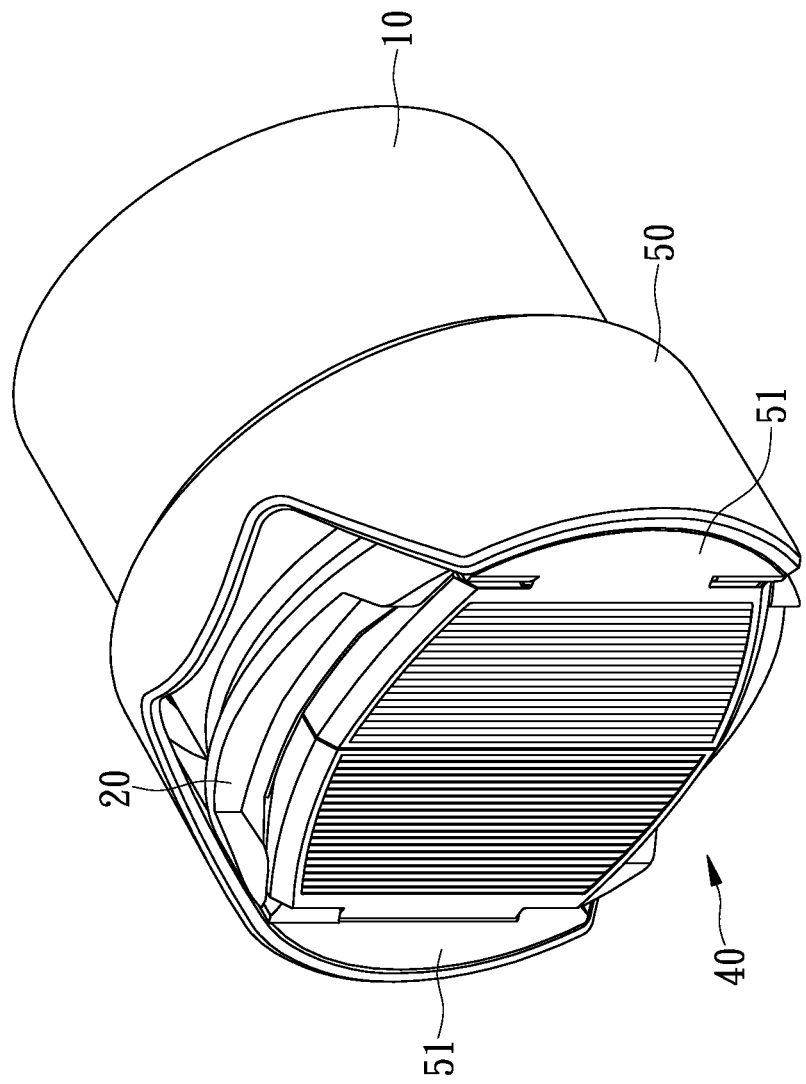
FIG. 1 is a perspective view of a lens cap in accordance with the present invention.
Figure 2:
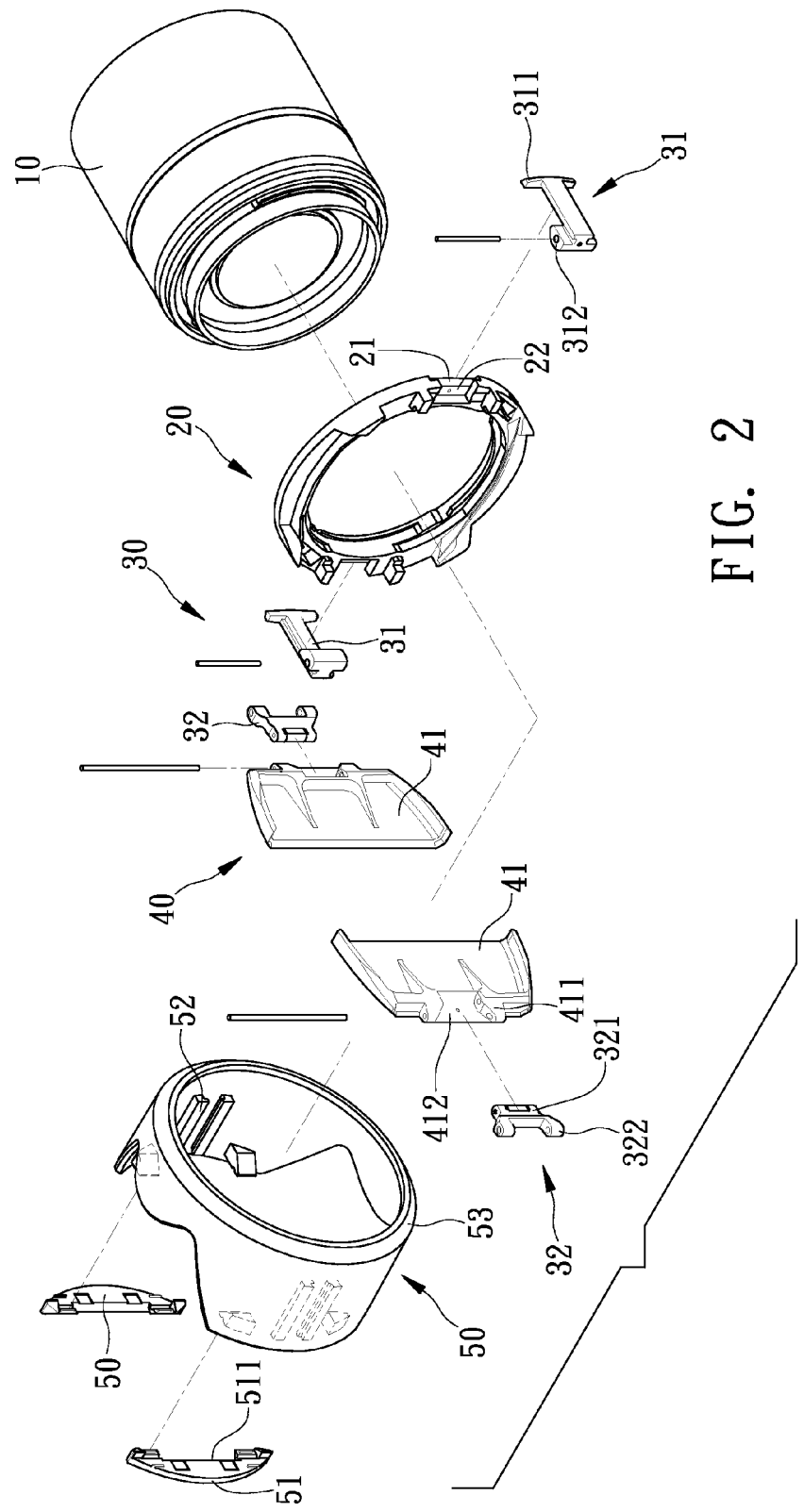
FIG. 2 is an exploded perspective view of the lens cap in FIG. 1.
Figure 3:
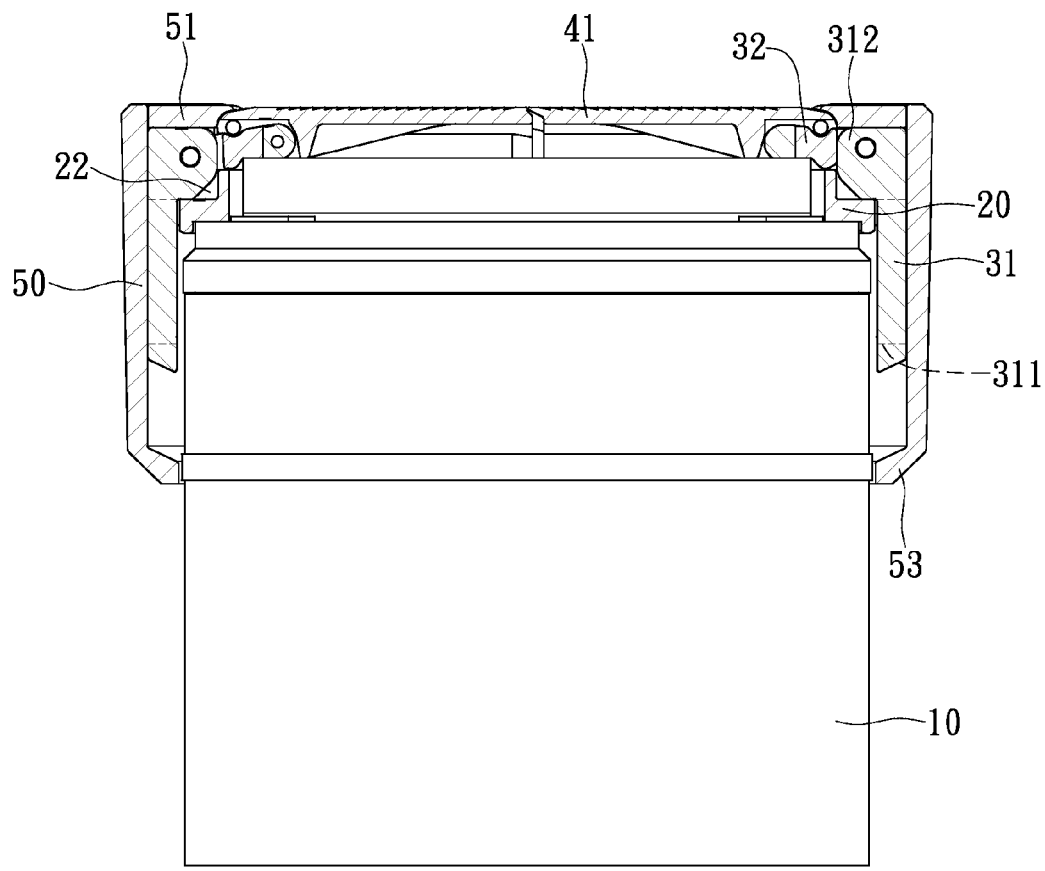
FIG. 3 is a cross-sectional view of the lend cap in FIG. 1 when being fully closed.

Referring to the drawings and initially to FIGS. 1-3, a lens cap in accordance with the present invention comprises a ring (20) detachably mounted onto a lens (10) of an optical apparatus (not shown) and a pair of linkage sets (30) pivotally connected to the ring (20), wherein the two linkage sets (30) are diametrically corresponding to each other and respectively connected to a covering structure (40). A sleeve (50) is longitudinally and slidably sleeved on the ring (20) and the covering structure (40) is connected to sleeve (50). As a result, the covering structure (40) selectively opens/closes the sleeve (50) when the sleeve (50) is reciprocally moved relative to the ring (10). The covering structure (40) and the sleeve (50) are used as a lens cap when the covering structure (40) closing the sleeve (50), and used as a lens hood when the covering structure (40) is opened.

The ring (20) includes two T-shaped grooves (21) defined therein and diametrically corresponding to each other. Two indentations (22) defined in one side of the ring (20) opposite to the lens (10) and each indentation (22) laterally communicates with a corresponding one of the two T-shaped grooves (21).

The sleeve (50) includes two connecting plates (51) secured on an inner periphery of a front end thereof, wherein the two connecting plates (51) diametrically correspond to each other. Each connecting plate (51) has a concave portion (511) defined in an interior thereof. Two rails (52) are formed on the inner periphery of the sleeve (50). Each rail (52) is disposed under a corresponding one the two connecting plates (51). An annular lip (53) inwardly extends from the inner periphery of a rear end of the sleeve (50). The annular lip (53) is selectively engaged to the two linkage sets (30) two prevent the sleeve (50) form an overly moved relative to the ring (20).

The covering structure (40) includes two covers (41) each having a pair of ears (411) extending therefrom and laterally pivotally mounted to two opposite sides of the concave portion (511) of the corresponding one of the two connecting plate (51). Each cover (41) has a cavity (412) defined therein within the pair of ears (411).

Each linkage set (30) includes a first linkage (31) slidably mounted onto a corresponding one of the two rails (52). A bar (311) transversely formed on a first end thereof and a pivot block (312) formed on a second end thereof, wherein the bar (311) is selectively received in a corresponding one of the two T-shaped grooves (21) to prevent the linkage sets (30), the covering structure (40) and the sleeve (50) from detaching from the ring (20). A second linkage (32) is pivotally connected to the pivot block (312). The second linkage (32) has a first pivot portion (321) and a second pivot portion (322), wherein the first pivot portion (321) has a male structure and the second pivot portion (322) has a female structure. The first pivot portion (321) is laterally pivotally mounted to two opposite sides of the cavity (412) in a corresponding one of the two cover (41) and the second pivot portion (322) is laterally pivotally connected to two opposite side of the pivot block (312).

Figure 4:
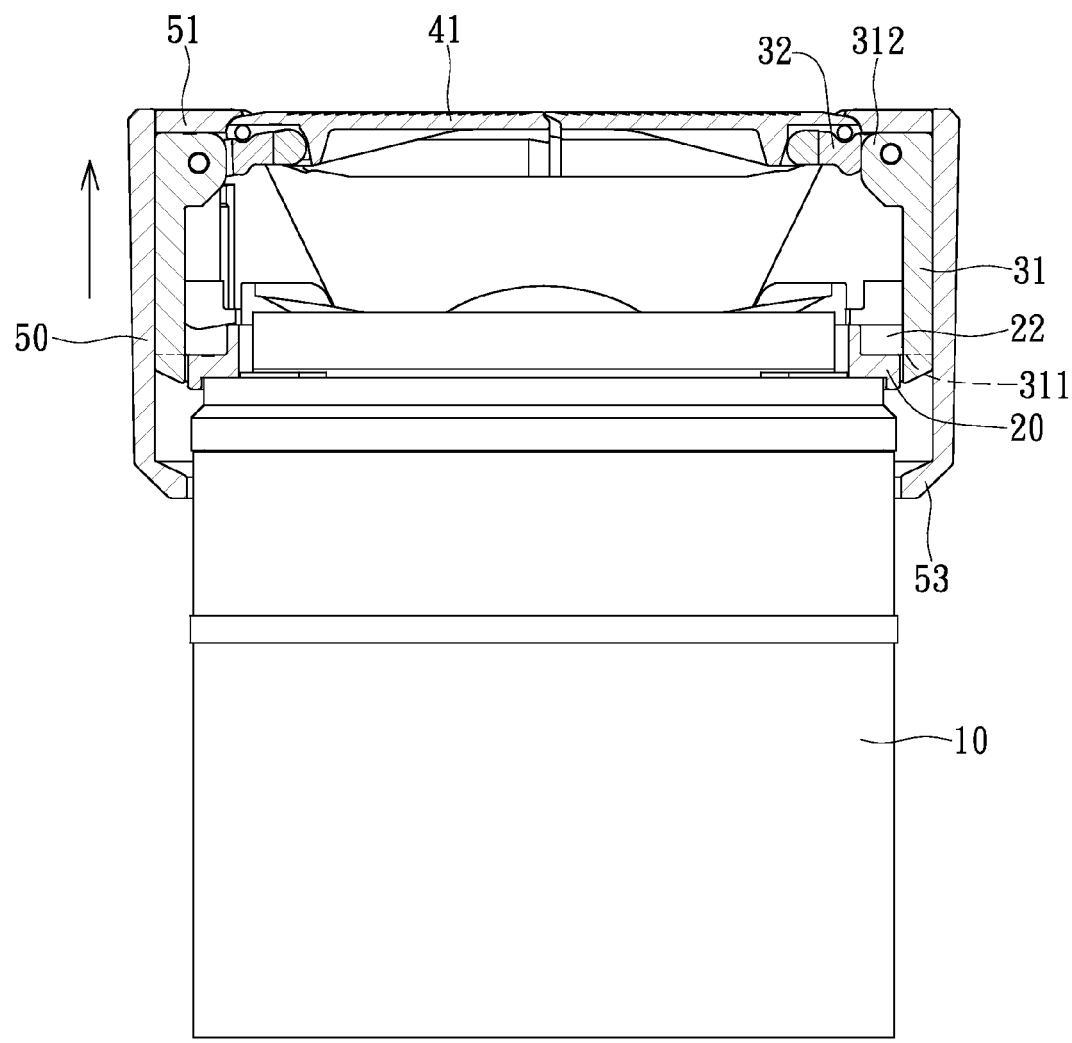
FIG. 4 is a first operational view of the lens cap in accordance with the present invention.
Figure 5:
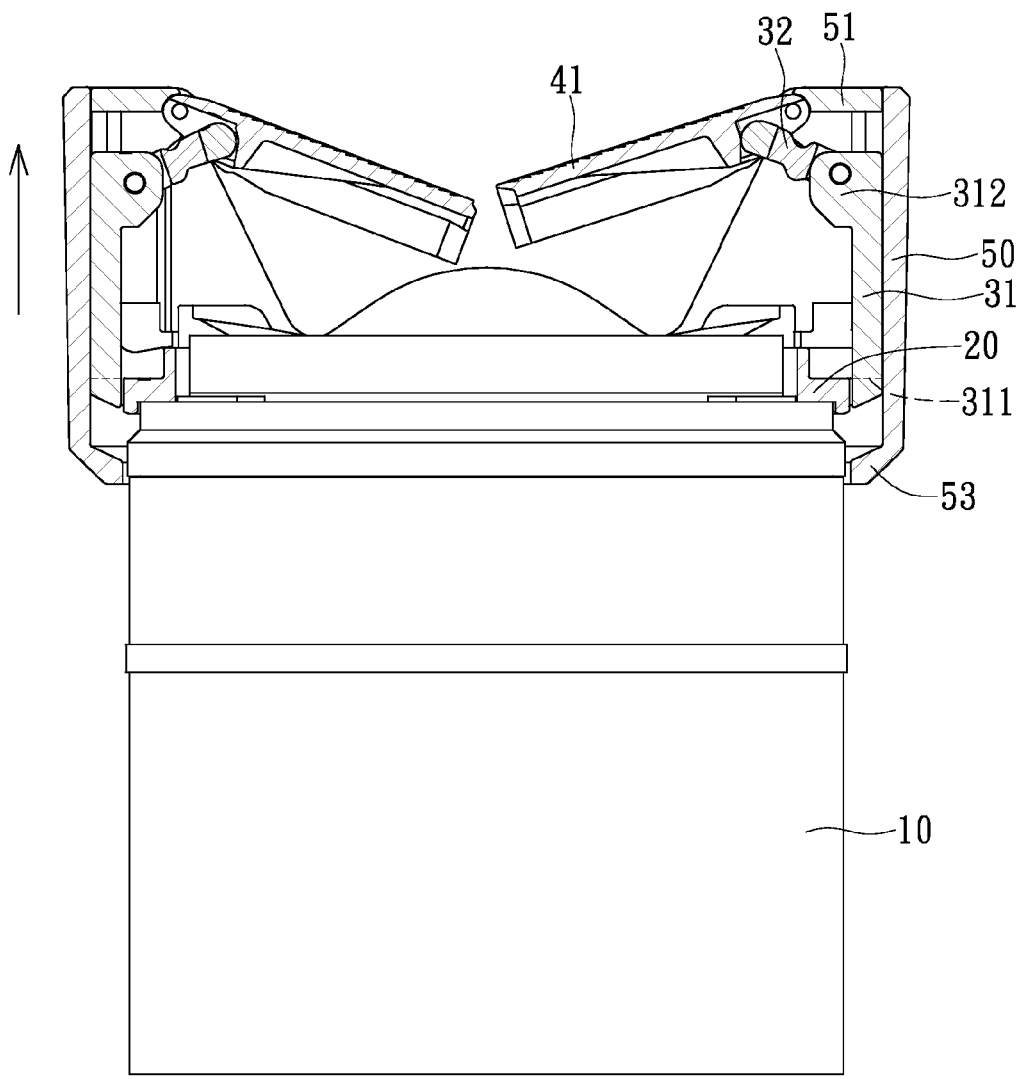
FIG. 5 is a second operational view of the lens cap in accordance with the present invention.
Figure 6:
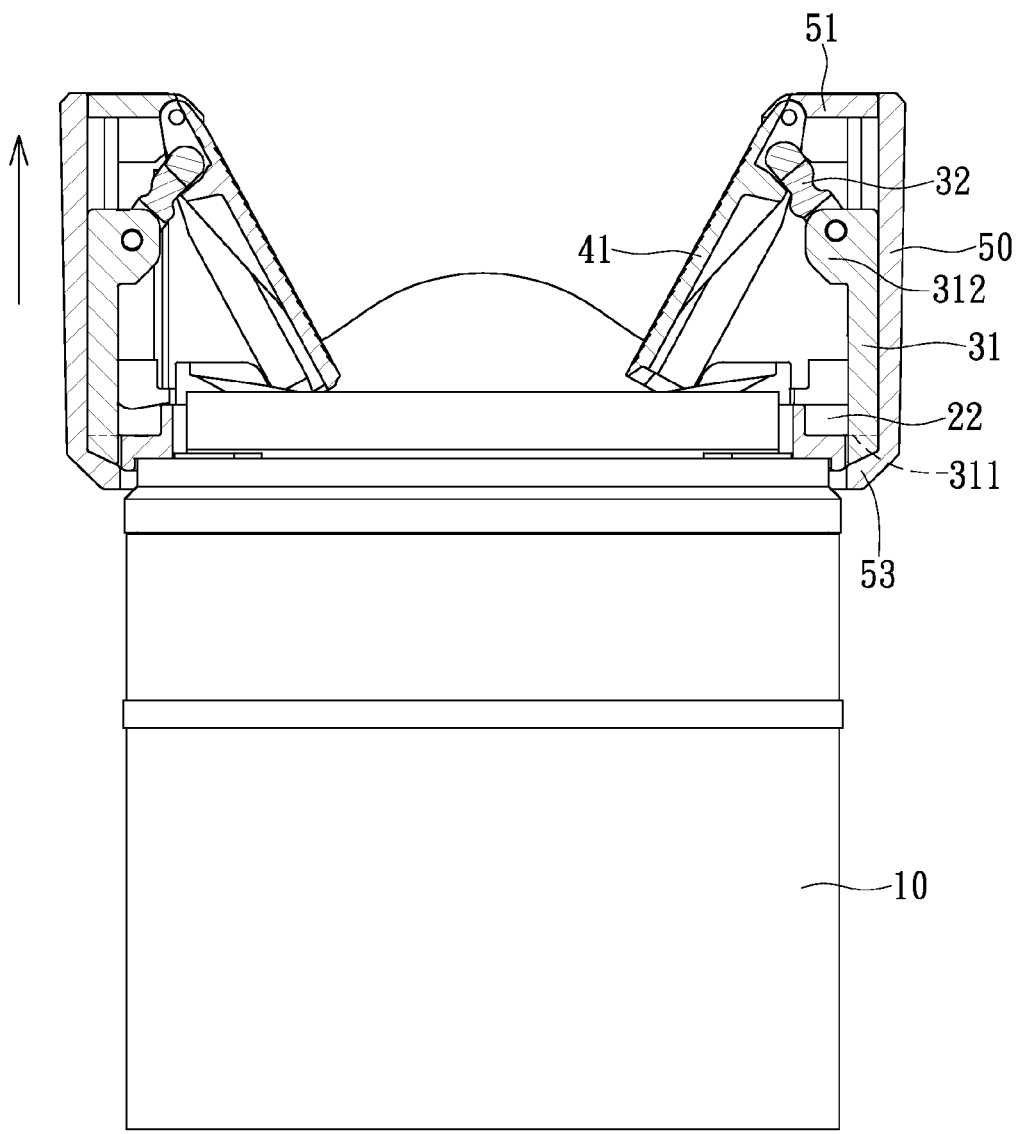
FIG. 6 is a cross-sectional view of the lend cap in FIG. 1 when being fully opened.

With reference to FIG. 1 through FIG. 3, the two covers (41) are horizontally abutting each other for closing the sleeve (50) and protecting the lens (10) from being scraped when the sleeve (50) surrounding the lens (10). The pivot block (312) of each of the first linkages (31) is partially received in a corresponding one of the two indentations (22) in the ring (20). With reference to FIGS. 3 and 4, the linkage sets (30) and the covering structure (40) are forward moved when the sleeve (50) forward moved relative to the lens (10), and then, the sleeve (50) is still closed by the covering structure (40). With reference to FIGS. 2 and 4-5, the first linkage (31) can not be moved relative to the ring (20) when the bar (311) is engaged into the T-shaped groove (21) in the ring (20). The first linkage (31) provides a pull force to the corresponding cover (41) via the second linkage (32) when the sleeve (50) continually moved, forward. The cover (41) is gradually swung along its pivot axis to open the lens cap in accordance with the present invention because the cover (41) is pivotally connected to the connecting plate (51). With reference to FIG. 6, the lens cap in accordance with the present invention is fully opened when the annular lip (50) abuts against the bar (311). When closing the lens cap in accordance with the present invention, the cameraman only need to reversely operate the sleeve (50).

As described above, the lens cap in accordance with the present invention is easily operated and can be used as a lens hood when being opened. Consequently, the lens cap in accordance with the present invention should not be lost because it does not need to be detached from the lens (10) before taking pictures.

Figure 7:
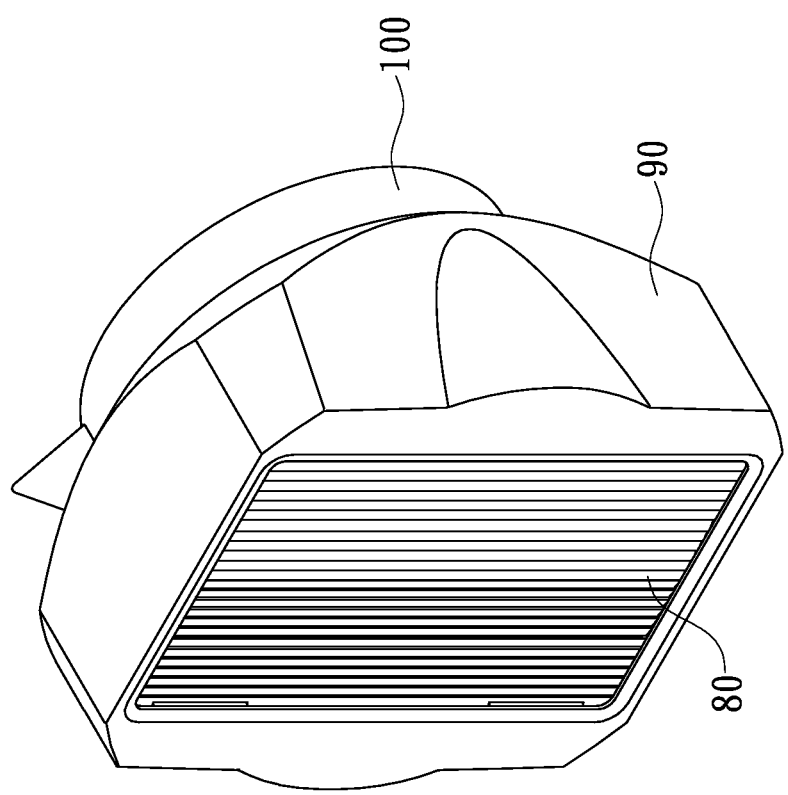
FIG. 7 is a perspective view of a second embodiment of the lens cap in accordance with the present invention.
Figure 8:
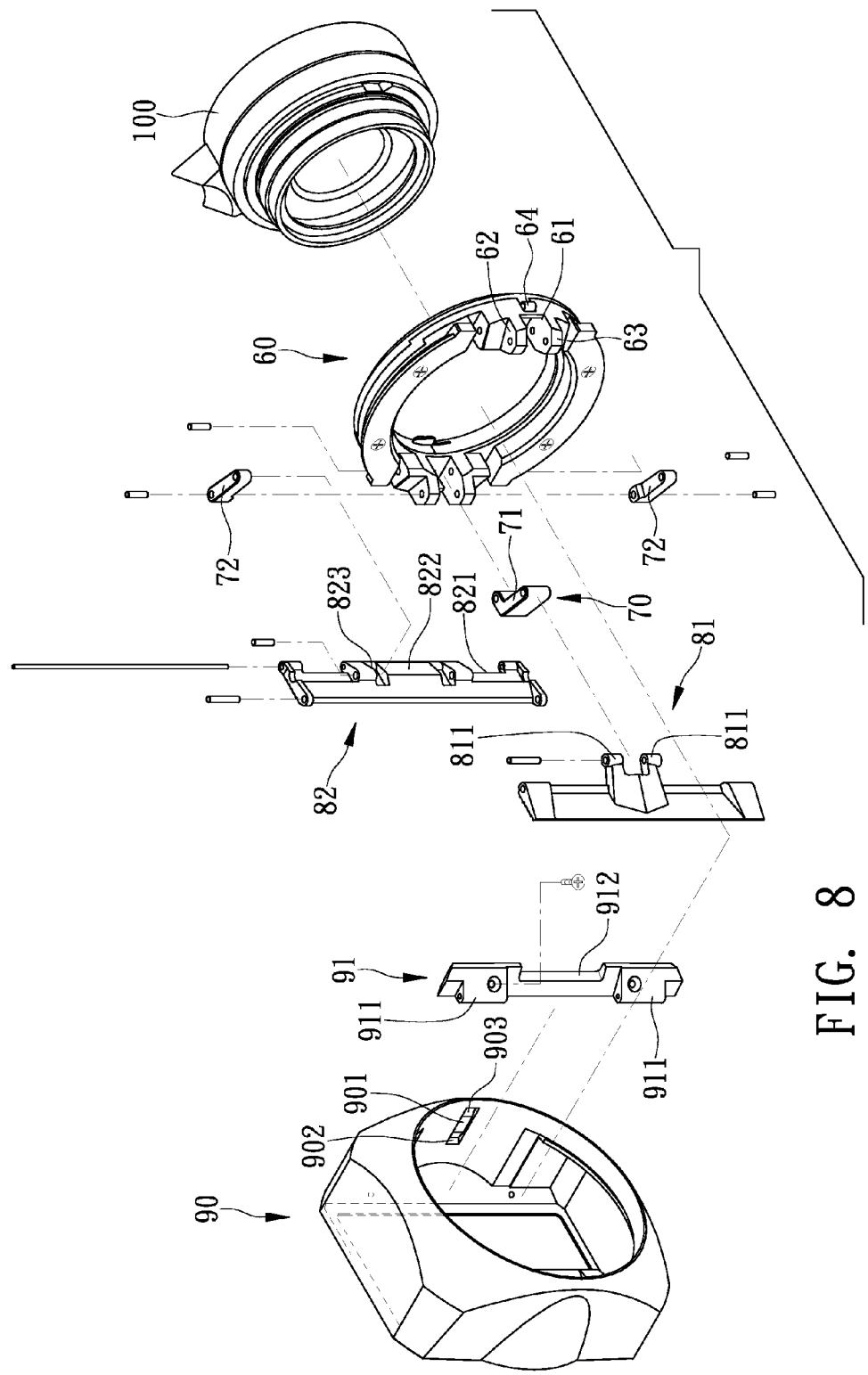
FIG. 8 is partially exploded perspective view of the lens cap in FIG. 7.
Figure 9:
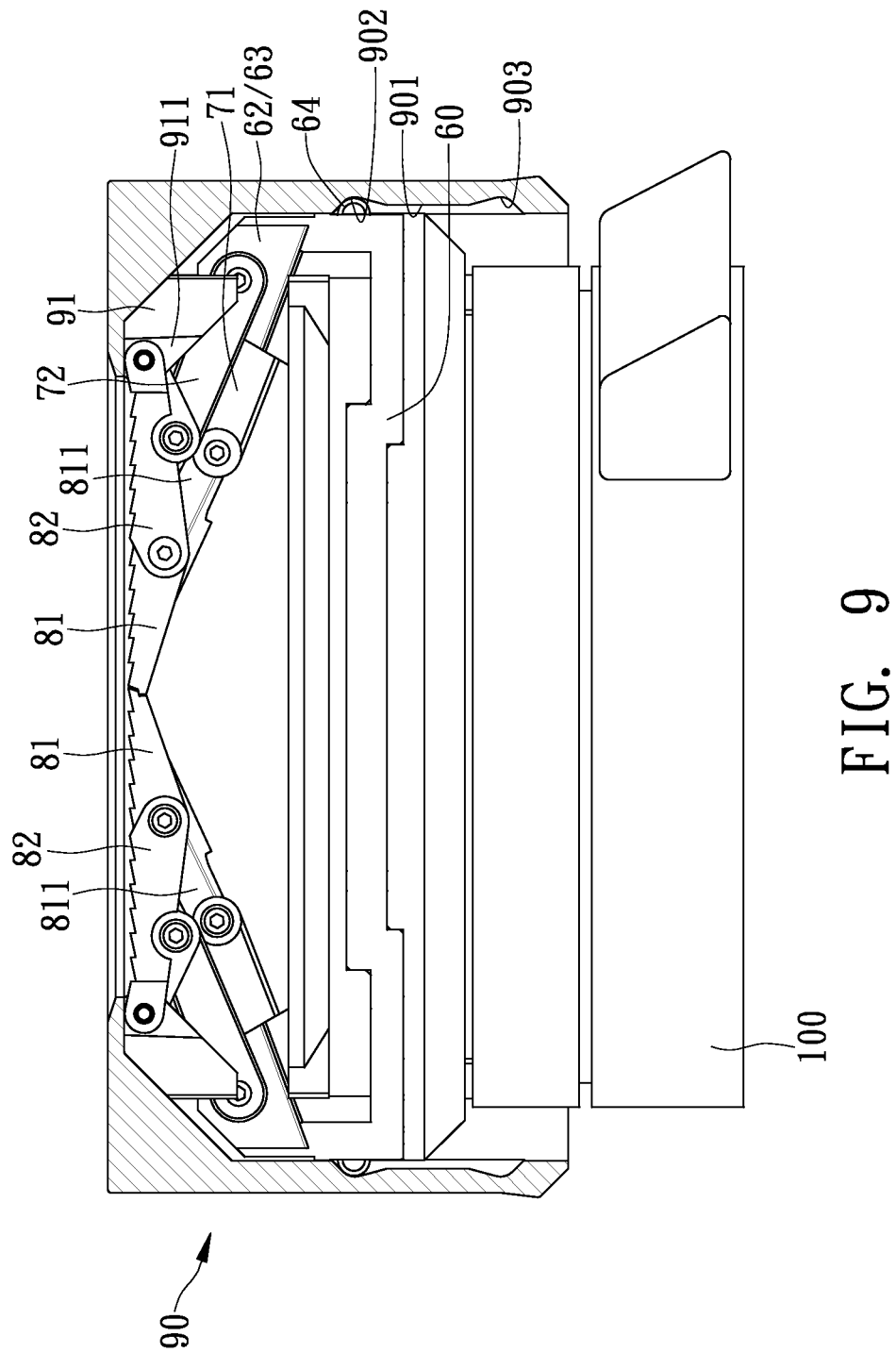
FIG. 9 is a cross-sectional view of the lens cap in FIG. 7 when being fully closed.

With reference to FIG. 7 through FIG. 9 that show a second embodiment of the present invention, in this embodiment, the lens cap in accordance with the present invention comprises a ring (60) detachably mounted onto a lens (100) of an optical apparatus (not shown) and a pair of linkage sets (70) pivotally connected to the ring (60), wherein the two linkage sets (70) are diametrically corresponding to each other and respectively connected to a covering structure (80). A sleeve (90) is longitudinally and slidably sleeved on the ring (60) and the covering structure (80) is connected to sleeve (90). As a result, the covering structure (80) selectively opens/closes the sleeve (90) when the sleeve (90) is reciprocally moved relative to the ring (60). The covering structure (80) and the sleeve (90) are used as a lens cap when the covering structure (80) closing the sleeve (90), and used as a lens hood when the covering structure (80) is opened.

The ring (60) includes two troughs (61) defined therein and diametrically corresponding to each other. A first ear (62) and a second ear (63) longitudinally extend from the ring (60) and respectively corresponding to two opposite sides of a corresponding one of the two troughs (61). Two resilient plates (64) laterally extending from the ring (60). Each resilient plate (64) aligns with a corresponding one of the two troughs (61).

The sleeve (90) includes two connecting plates (91) secured on an inner periphery of a front end thereof, wherein the two connecting plates (51) diametrically correspond to each other. Each connecting plate (91) has two opposite ends each having a pivot block (911) formed thereon and an indentation (912) laterally defined between the two pivot blocks (911). Two grooves (901) are longitudinally defined in the inner periphery of the sleeve (90). Each groove (901) centrally aligns with a corresponding one of the two connecting plates (91). A first indentation (902) and a second indentation (903) are respectively defined in two opposite ends of a bottom of each of the two grooves (901). Each resilient plate (64) is slidably moved in a corresponding one of the two grooves (901). The resilient plate (64) is engaged into the first indentation (902) when the lens cap is closed and engaged into the second indentation (903) when the lens cap is opened.

The covering structure (80) includes two first covers (81) and two second covers (82), wherein an outer side of the first cover (81) is laterally pivotally connected to an inner side of the second cover (82). The first cover (81) has two ear (811) centrally extending therefrom. The second cover (82) includes two first grooves (821) respectively defined in two opposite ends of an outer side of the second cover (82) such that a connecting block (822) is formed between the two first groove (821). The connecting block (822) has two opposite ends each having a second groove (823) defined therein. The two pivot blocks (911) of each of the connecting plate (91) is laterally pivotally in two first grooves (821) in a corresponding one of the two second cover (82).

Each linkage set (70) includes a first linkage (71) respectively pivotally connected to the first cover (81) and the ring (60), and two second linkages (72) respectively pivotally connected to the ring (60) and the second cover (82). The first linkage (71) has a first end laterally pivotally mounted into a lower portion of a corresponding one of the two troughs (61) in the ring (60) and a second end laterally pivotally to the two ears (811) of the first cover (81). The two second linkages (72) respectively have a first end laterally pivotally connected to the first ear (62) and the second ear (63), and a second end respectively pivotally and laterally mounted into a corresponding one of the two second grooves (823).

Figure 10:
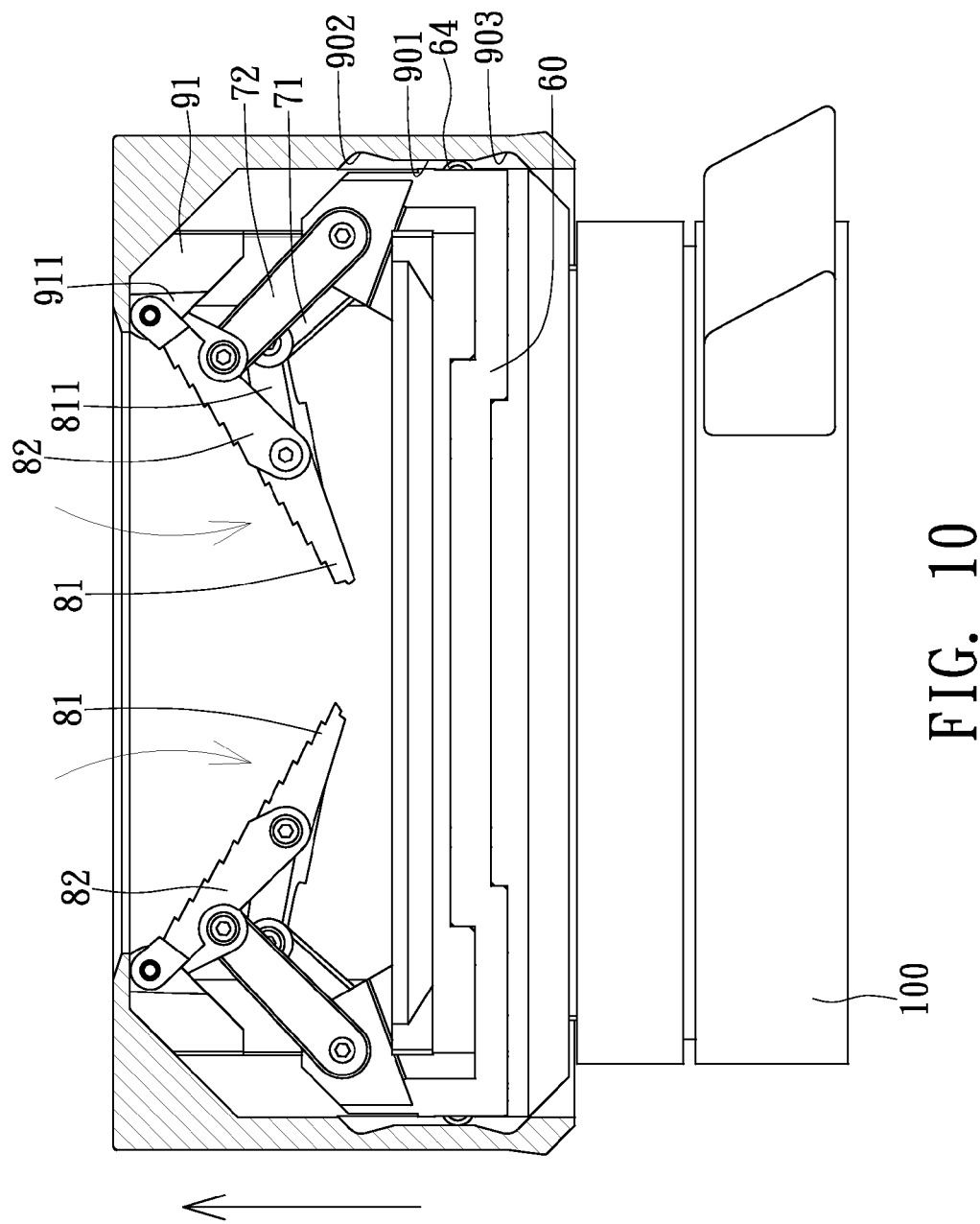
FIG. 10 is an operational view on the lens cap in FIG. 7.
Figure 11:
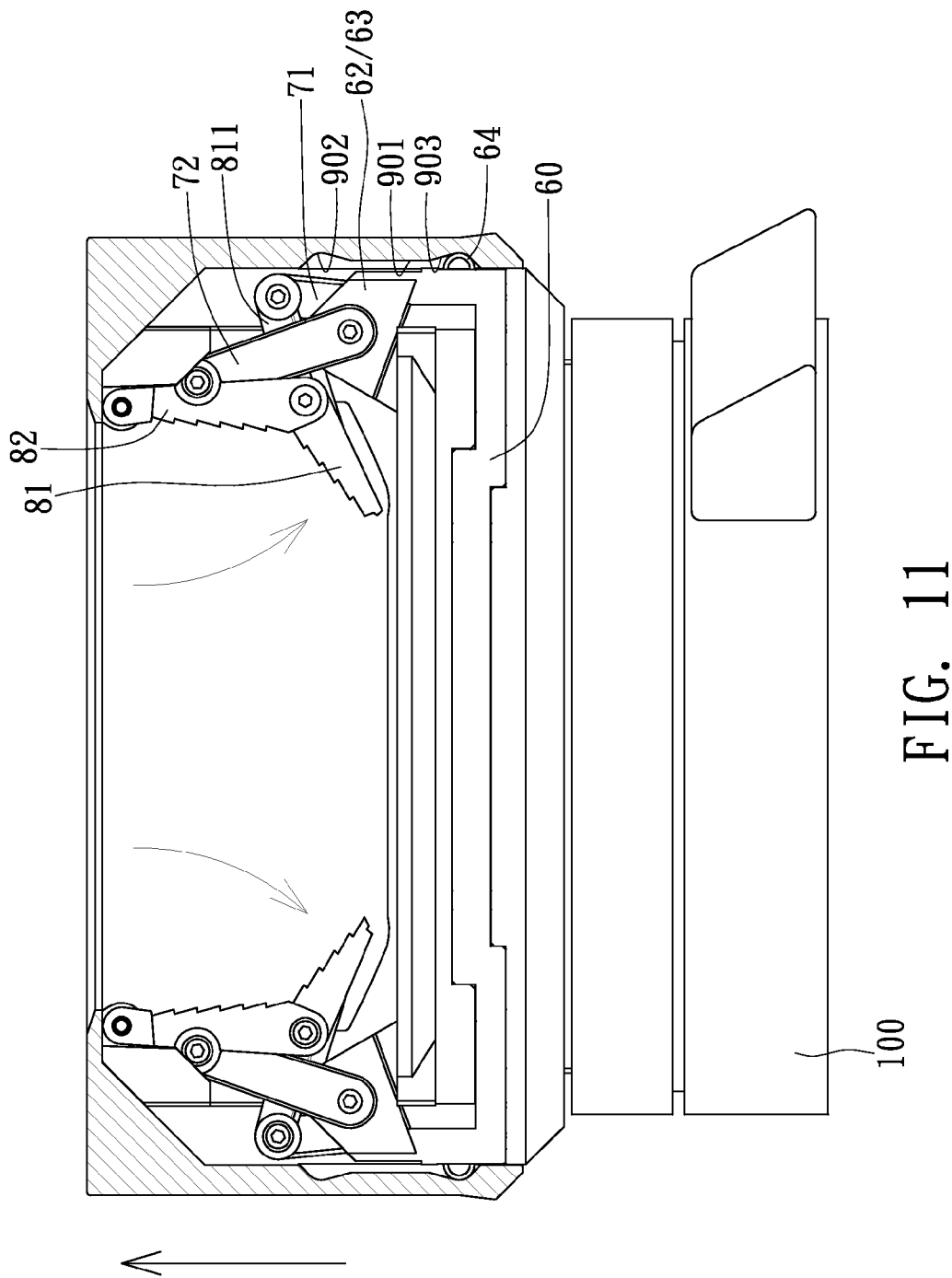
FIG. 11 is a cross-sectional view of the lens cap in FIG. 7 when being fully opened.

With reference to FIG. 9 through FIG. 11, the first covers (81) and second covers (82) sequentially laterally and horizontally abut one another for closing the sleeve (90) for protecting the lens (100) from being scraped when the sleeve (90) surrounding the lens (100). Then, the resilient plates (64) of the ring (60) are respectively engaged into a corresponding one of the two first indentations (902). The first linkage (71) and the second linkage (72) respectively pull the first cover (81) and the second cover (82) to make the covers (81, 82) gradually swung toward the inner periphery of the sleeve (50) because the first ends of the first linkages (71) and the second linkages (72) is pivotally connected to the ring (60) when the sleeve (90) is forward moved. As a result, the lens cap in accordance with the present invention is gradually opened. At the moment, the two resilient plates (64) are respectively slidably in a corresponding one of the two grooves (901) in the sleeve (90). The lens cap in accordance with the present invention is fully opened when the resilient plates (64) of the ring (60) are respectively engaged into a corresponding one of the two second indentations (903) after the sleeve (90) is continually forward moved.

Although the invention has been explained in relation to its preferred embodiment, it is to be understood that many other possible modifications and variations can be made without departing from the spirit and scope of the invention as hereinafter claimed.

What is claimed is:

1. A lens cap comprising a ring adapted to be detachably mounted onto a lens of an optical apparatus, a pair of opposite linkage sets pivotally connected to the ring, a covering structure connected to the linkage sets, a sleeve longitudinally and slidably placed on the ring and connected to the covering structure, wherein the covering structure selectively opens/closes the sleeve when the sleeve is reciprocally moved relative to the ring, wherein the covering structure and the sleeve are used as a lens cap when the covering structure closes the sleeve, wherein the covering structure and the sleeve are used as a lens hood when the covering structure opens the sleeve, wherein the ring includes two opposite T-shaped grooves defined therein and two indentations defined in a side thereof opposite to the lens, wherein each of the indentations is in communication with a corresponding one of the T-shaped grooves.

2. A lens cap including a ring adapted for detachable attachment to a lens of an optical apparatus, a pair of opposite linkage sets pivotally connected to the ring, a covering structure connected to the linkage sets, a sleeve longitudinally and slidably placed on the ring and connected to the covering structure, wherein the covering structure selectively opens/closes the sleeve when the sleeve is reciprocally moved relative to the ring, wherein the covering structure and the sleeve are used as a lens cap when the covering structure closes the sleeve, wherein the covering structure and the sleeve are used as a lens hood when the covering structure opens the sleeve, wherein the sleeve includes two opposite connecting plates secured on an inner periphery of a front end thereof, wherein each connecting plate includes a concave portion defined in an interior thereof, two rails formed on the inner periphery of the sleeve and each placed under a corresponding one of the two connecting plates, an annular lip inwardly extending from the inner periphery of a rear end of the sleeve, wherein the annular lip is selectively engaged to the two linkage sets to prevent the sleeve from excessive movement relative to the ring.

3. The lens cap as claimed in claim 1, wherein the sleeve includes two opposite connecting plates secured on an inner periphery of a front end thereof, wherein each connecting plate includes a concave portion defined in an interior thereof, two rails formed on the inner periphery of the sleeve and each disposed under a corresponding one of the two connecting plates, an annular lip inwardly extending from the inner periphery of a rear end of the sleeve, wherein the annular lip is selectively engaged to the two linkage sets to prevent the sleeve from excessive movement relative to the ring.

4. The lens cap as claimed in claim 3, wherein the covering structure includes two covers each having a pair of ears extending therefrom and laterally pivotally mounted to two opposite sides of the concave portion of the corresponding one of the two connecting plate, each cover having a cavity defined therein within the pair of ears.

5. The lens cap as claimed in claim 2, wherein the covering structure includes two covers each having a pair of ears extending therefrom and laterally pivotally mounted to two opposite sides of the concave portion of the corresponding one of the two connecting plate, each cover having a cavity defined therein within the pair of ears.

6. The lens cap as claimed in claim 4, wherein each linkage set includes a first linkage slidably mounted onto a corresponding one of the two rails, a bar transversely formed on a first end thereof and a pivot block formed on a second end thereof, wherein the bar is selectively received in a corresponding one of the two T-shaped groove to prevent the linkage sets, the covering structure and the sleeve from detaching from the ring, a second linkage pivotally connected to the pivot block, the second linkage having a first pivot portion and a second pivot portion, wherein the first pivot portion has a male structure and the second pivot portion has a female structure, the first pivot portion laterally pivotally mounted to two opposite sides of the cavity in a corresponding one of the two cover and the second pivot portion laterally pivotally connected to two opposite side of the pivot block.

7. The lens cap as claimed in claim 5, wherein each linkage set includes a first linkage slidably mounted onto a corresponding one of the two rails, a bar transversely formed on a first end thereof and a pivot block formed on a second end thereof, wherein the bar is selectively received in a corresponding one of the two T-shaped groove to prevent the linkage sets, the covering structure and the sleeve from detaching from the ring, a second linkage pivotally connected to the pivot block, the second linkage having a first pivot portion and a second pivot portion, wherein the first pivot portion has a male structure and the second pivot portion has a female structure, the first pivot portion laterally pivotally mounted to two opposite sides of the cavity in a corresponding one of the two cover and the second pivot portion laterally pivotally connected to two opposite side of the pivot block.

8. A lens cap including a ring adapted for detachable attachment to a lens of an optical apparatus, a pair of opposite linkage sets pivotally connected to the ring, a covering structure connected to the linkage sets, a sleeve longitudinally and slidably placed on the ring and connected to the covering structure, wherein the covering structure selectively opens/closes the sleeve when the sleeve is reciprocally moved relative to the ring, wherein the covering structure and the sleeve are used as a lens cap when the covering structure closes the sleeve, wherein the covering structure and the sleeve are used as a lens hood when the covering structure opens the sleeve, wherein the ring includes two opposite troughs defined therein a pair of ears formed on two opposite sides of each of the two troughs, and two resilient plates laterally extending from the ring and each aligning with a corresponding one of the two troughs.

9. The lens cap as claimed in claim 8, wherein the sleeve includes two connecting plates secured on an inner periphery of a front end thereof, wherein the two connecting plates diametrically correspond to each other, each connecting plate having two opposite ends each having a pivot block formed thereon and an indentation laterally defined between the two pivot blocks, two grooves longitudinally defined in the inner periphery of the sleeve, each groove centrally aligning with a corresponding one of the two connecting plates, a first indentation and a second indentation respectively defined in two opposite ends of a bottom of each of the two grooves, each resilient plate slidably moved in a corresponding one of the two grooves, the resilient plate engaged into the first indentation when the lens cap is closed and engaged into the second indentation when the lens cap is opened.

10. The lens cap as claimed in claim 9, wherein the covering structure includes two first covers and two second covers, wherein an outer side of the first cover is laterally pivotally connected to an inner side of the second cover, the first cover having two ears centrally extending therefrom, the second cover including two first grooves respectively defined in two opposite ends of an outer side of the second cover such that a connecting block is formed between the two first groove, the connecting block having two opposite ends each having a second groove defined therein, the two pivot blocks of each of the connecting plate laterally pivotally in two first grooves in a corresponding one of the two second cover.

11. The lens cap as claimed in claim 10, wherein each linkage set includes a first linkage respectively pivotally connected to the first cover and the ring, and two second linkages respectively pivotally connected to the ring and the second cover, the first linkage having a first end laterally pivotally mounted into a lower portion of a corresponding one of the two troughs in the ring and a second end laterally pivotally to the two ears of the first cover, the two second linkages each including a first end laterally pivotally connected to a corresponding pair of ears of the ring and a second end pivotally and laterally mounted into a corresponding one of the two second grooves.

* * * * *